Feb. 21, 1956 A. ESSEL 2,735,899

DEVICE FOR GUIDING THE TAPE IN MAGNETIC TAPE RECORDERS

Filed June 19, 1951

Inventor,
Anton Essel,
By [signature] Atty.

United States Patent Office 2,735,899

Patented Feb. 21, 1956

2,735,899

DEVICE FOR GUIDING THE TAPE IN MAGNETIC TAPE RECORDERS

Anton Essel, Munich, Germany, assignor to Klangfilm Gesellschaft mit beschraenkter Haftung, Berlin and Karlsruhe, Germany, a German corporation Application June 19, 1951, Serial No. 232,295

Claims priority, application Germany October 1, 1948

7 Claims. (Cl. 179—100.2)

This invention is concerned with a device for guiding the tape in magnetic tape recorders and the like.

The magnetic tape is in known tape recorders guided so that it moves in a substantially straight line past the transducer which may be the recording or the pickup head. The disadvantage of such arrangements is that the stray magnetic field exerts a detrimental influence on the quality of the production.

In order to avoid this drawback, the invention proposes to guide the magnetic tape at the sound control point or gap formed by the transducer through a curved path in such a manner that the stray magnetic field is practically ineffective. The curvature of the tape may assume a definite configuration by guiding the tape about suitably constructed guide roller means.

In accordance with another feature of the invention, the tape may be curved, incident to the recording operation, so that the outer fibers of its magnetic layer are noticeably stretched or extended. If the tape is then, incident to reproduction, curved in opposite direction, the outer fibers of its magnetic layer will be contacted or compressed, effecting thereby in a sense a narrowing or contraction of the gap, thus improving the frequency response, especially in the higher frequencies.

Figure 2:
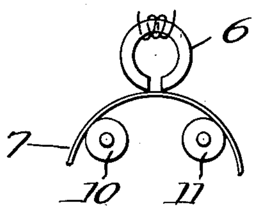
Figure 3:
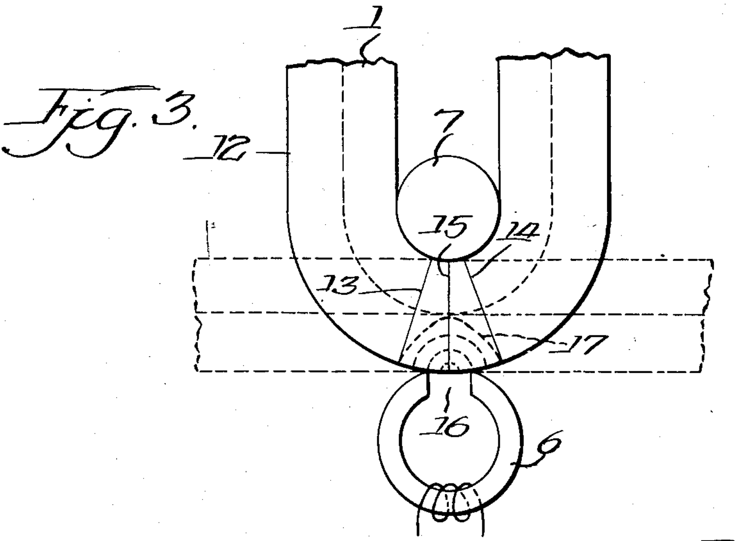

The above indicated objects and additional objects and features will appear from the detailed description which will presently be rendered with reference to the accompanying drawings. In these drawings, Fig. 1 shows in diagramatic manner an embodiment employing a roller or tape drum for guiding the tape through a curved path at a point opposite a magnetic head;

Fig. 2 indicates diagrammatically an embodiment employing guide rollers which force the tap to bulge so as to move through a curved path past a magnetic head; and Fig. 3 illustrates, on an enlarged scale, a magnetic tape moving in curved position immediately adjacent a magnetic head, whereby the fibers of the outer magnetic layer on the tape are stretched or extended so as to minimize or to avoid detrimental effects of the stray magnetic field of the head.

Figure 1:
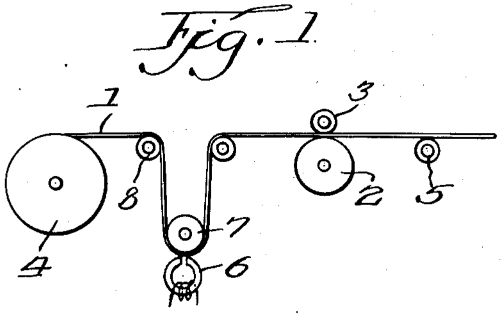

Referring now to Fig. 1: numeral 1 indicates a magnetic tape which is moved by a drive roller 2 coacting with a counter roller 3, unwinding the tape from a supply reel 4 for winding it upon the receiving reel 5. The sound control point formed by the transducer or magnetic head 6, which may be a recording head, lies adjacent the guide roller 7 or tape drum 7 which is laterally spaced from the guide rollers 8, 9. The tape is in this manner forced to move at the sound control point through a curved path, the curvature extending angularly away from the recording head 6. The stray magnetic field practically cannot reach the tape. The magnetic layer of the tape faces the recording head. The latter engages the tape suitably with a fine touch. The coaction may be such that the recording head exerts a slight pressure on theh tape, e. g., by the action of suitable springs or by providing on the guide roller a layer of yieldable material, or both, as pointed out in co-pending application, Ser. No. 230,202, filed June 6, 1951, now abandoned. It is not absolutely necessary, for avoiding the effect of the stray magnetic field, to provide for parallel motion of the tape legs on both sides of the gas or sound control point. The tape may be guided that its legs form relative to the sides of the control point an angle of 90°. The essential requirement is that the curvature is disposed within the detrimental stray magnetic field.

It is similarly not absolutely necessary to provide for a curvature of the tape at both sides of the sound control point, it being sufficient under certain conditions to provide for a curvature of the tape at the trailing side of the magnetic head where the detrimental effects of the stray field are strongest.

The curvature of the tap may also be realized by guiding it over two spaced guide rollers so as to obtain bulging of the tape, as diagrammatically illustrated in Fig. 2. The tape moves in this embodiment over the guide rollers 10, 11 and bulges outwardly by its inherent elasticity to assume the desired curvature, thus moving out of the stray magnetic field of the head 7.

The degree of curvature may not be determined only by the spacing of the two guide rollers but also by the diameter thereof. An embodiment employing this latter feature has the particular advantage that the elasticity of the tape is brought into operation incident to the engagement of the magnetic head with the tape.

The arrangement is of course analogously applicable for use with a transducer forming a pickup head. It is also possible to provide a plurality of sound control points employing the invention. The erasing head may, if desired, be provided at the point where the tape moves along a straight path.

The particular effect obtained by the curvature of the tape at the point of sound control, will now be explained with reference to Fig. 3, showing the parts on an enlarged scale.

The magnetic layer 12 of the tape 1, which is arcuately curved around the drum or guide roller 7, is extended or stretched in its outer fibers and contracted or compressed in its inner fibers, as indicated in Fig. 3 by the lines 13—14 relative to the line 15. The effect across the recording width of the tape of the magnetic head extends approximately in accordance with a field which is indicated by the lines 16—17.

If the tape is, incident to reproduction of replaying, guided through a straight path, as indicated in Fig. 3 in dotted lines, the outer fibers of the layer will again contract, thus achieving in a sense a narrowing of the gap and thereby improving the repsonse in the higher frequencies.

This particular effect may be further enhanced and improved by providing for a pronounced curving of the tape in opposite direction. The outer fibers will then be disposed on the inside and their curvature will be greater than that of the corresponding inner fibers. The inwardly positioned tape parts will thus be contracted or compressed, thereby providing for a further narrowing of the gap.

In order to utilize this effect, the transducer forming the pickup or reproduce head would of course be positioned inside of the curvature of the tape, i. e., in a position similar to that of the roller 7 shown in Fig. 3.

The device for curving the magnetic tape immediately adjacent the gap or sound control point formed by the magnetic head thus affects the density of the magnetic layer on the tape for the purpose of improving the magnetic coaction of the head with the tape.

A particular advantage of the invention is seen in the fact that it gives greater freedom in the design and construction of transducer without sacrifice of quality in the operation. The invention improves the quality of recording and/or reproduction.

Changes may be made within the scope and spirit of the appended claims.

I claim:

1. In a magnetic recorder having a tape carrying a magnetic layer and a first and a second transducer coacting therewith and having means for moving said tape, a device for guiding said tape in its motion with respect to said transducers, said device comprising first means for deflecting said tape for motion through a first path along which the constituents of said magnetic layer are extended for motion in extended condition past said first transducer, and second means for thereafter deflecting said tape for motion through a second path along which the constituents of said magnetic layer are compressed for motion in compressed condition past said second transducer.

2. The structure defined in claim 1, wherein said first means effects deflection of said tape for motion through said first path describing a curvature with the convex side thereof facing said first transducer and wherein said second means effects deflection of said tape for motion through said second path describing a curvature with the concave side thereof facing said second transducer.

3. The structure defined in claim 1, wherein said first means effects deflection of said tape for motion through first first path describing a curvature with the convex side thereof facing said first transducer and wherein said second means effects deflection of said tape for motion in a substantially straight line past said second transducer.

4. The structure defined in claim 1, wherein said first means for deflecting said tape for motion through said first path comprises a roller, and means for resiliently supporting said roller.

5. The structure defined in claim 1, wherein said first means for deflecting said tape for motion through said first path comprises a roller, and means forming on said roller a resilient layer.

6. The structure defined in claim 1, wherein said first means for deflecting said tape for motion through said first path comprises a roller, means for resiliently supporting said roller, and means forming on said roller a resilient layer.

7. The structure defined in claim 1, wherein said first means for deflecting said tape for motion through said first path comprises a pair of rollers for guiding said tape to form a bulge extending along a curvature with the convex side thereof facing said first transducer.

References Cited in the file of this patent

UNITED STATES PATENTS

| | | |
|---|---|---|
| 2,485,839 | O'Dea | Oct. 25, 1949 |
| 2,620,404 | Pond | Dec. 2, 1952 |
| 2,628,288 | Blaney | Feb. 10, 1953 |
| 2,637,785 | Charlin | May 6, 1953 |

FOREIGN PATENTS

| | | |
|---|---|---|
| 69,273 | Norway | May 28, 1945 |